United States Patent [19]
Mallinckrodt

[11] Patent Number: 5,339,330
[45] Date of Patent: * Aug. 16, 1994

[54] INTEGRATED CELLULAR COMMUNICATIONS SYSTEM

[75] Inventor: Albert J. Mallinckrodt, Santa Ana, Calif.

[73] Assignee: David D. Otten, Redondo Beach, Calif.

[*] Notice: The portion of the term of this patent subsequent to Dec. 17, 2008 has been disclaimed.

[21] Appl. No.: 781,972

[22] Filed: Oct. 24, 1991

Related U.S. Application Data

[63] Continuation-in-part of Ser. No. 495,497, Mar. 19, 1990, Pat. No. 5,073,900.

[51] Int. Cl.⁵ .............................................. H04L 27/30
[52] U.S. Cl. .................................................... 375/1
[58] Field of Search .............. 375/1; 380/34; 370/18; 379/59, 60; 455/33.1-33.4, 53.1, 54.1, 54.2

[56] References Cited

U.S. PATENT DOCUMENTS

| | | | |
|---|---|---|---|
| Re. 32,905 | 4/1989 | Baran | 375/1 |
| 3,714,573 | 1/1973 | Grossman | 375/1 |
| 4,481,527 | 6/1989 | Raychaudhuri et al. | 375/1 |
| 4,928,274 | 5/1990 | Gilhousen et al. | 370/92 |
| 4,979,170 | 12/1990 | Gilhousen et al. | 370/104.1 |
| 5,017,926 | 5/1991 | Ames et al. | 342/353 |
| 5,056,106 | 10/1991 | Wang et al. | 375/1 |
| 5,056,109 | 10/1991 | Gilhousen et al. | 375/1 |
| 5,073,900 | 12/1991 | Mallinckrodt | 375/1 |
| 5,093,840 | 3/1992 | Schilling | 375/1 |
| 5,101,501 | 3/1992 | Gilhousen et al. | 375/1 |
| 5,103,459 | 4/1992 | Gilhousen et al. | 375/1 |
| 5,109,390 | 4/1992 | Gilhousen et al. | 375/1 |
| 5,126,748 | 6/1992 | Ames et al. | 342/353 |
| 5,138,631 | 8/1992 | Taylor | 375/1 |
| 5,164,958 | 11/1992 | Omura | 375/1 |

FOREIGN PATENT DOCUMENTS 8001030 10/1979 PCT Int'l Appl. ............ H04Q 7/04

OTHER PUBLICATIONS

Supplementary European Search Report EP 91 90 8014, Nov. 9, 1992.

Primary Examiner—Salvatore Cangialosi
Attorney, Agent, or Firm—William H. Drummond

[57] ABSTRACT

A cellular communications system is provided having both surface and satellite nodes which are fully integrated for providing service over large areas. A spread spectrum system is used with code division multiple access (CDMA) employing forward error correction coding (FECC) to enhance the effective gain and selectivity of the system. Multiple beam, relatively high gain antennas are disposed in the satellite nodes to establish a first set of cells, and by coupling the extra gain obtained with FECC to the high gain satellite-node antennas, enough gain is created in the satellite part of the system such that a user need only use a small, mobile handset with a non-directional antenna for communications with both ground nodes and satellite nodes. User position information is also available. A digital data interleaving feature reduces fading. Each transmitter includes a coder representative of its output power level. Receivers compare this code to the received signal strength and adjust their associated transmitter power output level accordingly. An inter-cell bus is formed in a super-surface node which receives signals from a plurality of cells, frequency multiplexes those signals and transmits the multiplexed signal to the plurality of cells.

12 Claims, 6 Drawing Sheets

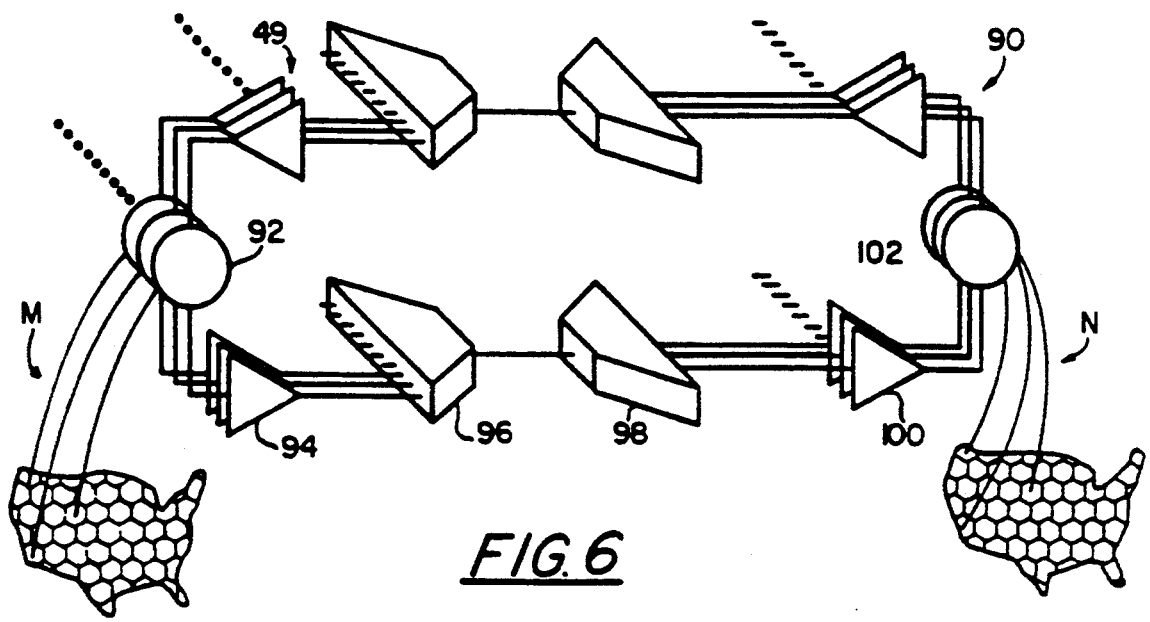
FIG. 6
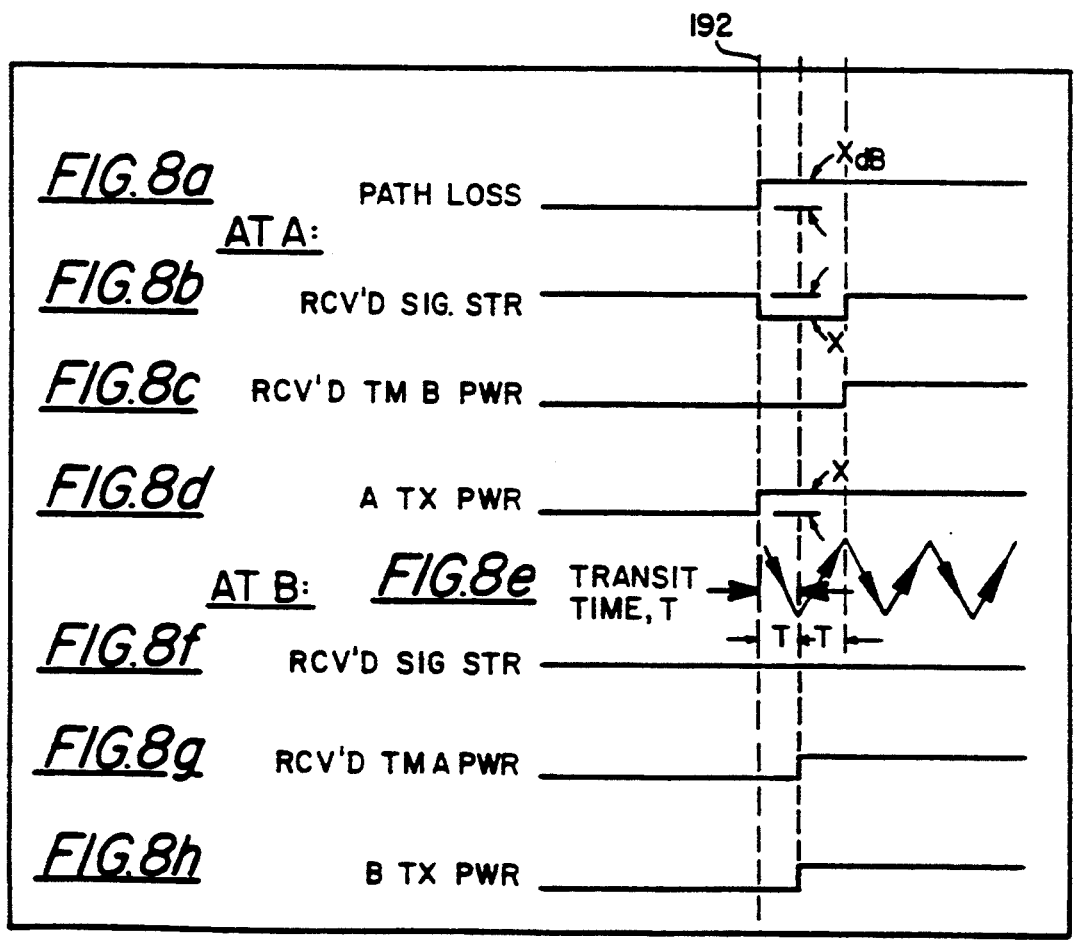

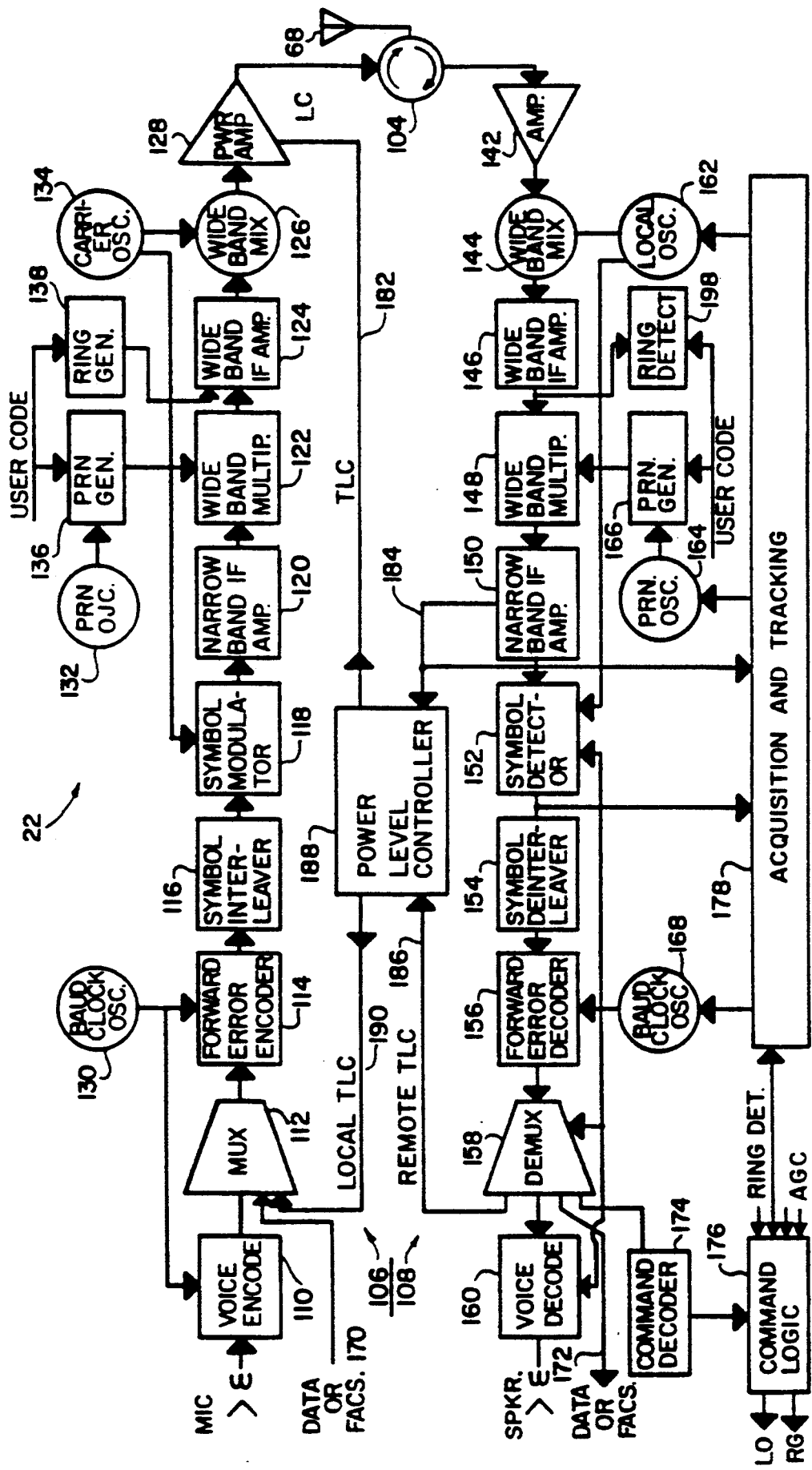

INTEGRATED CELLULAR COMMUNICATIONS SYSTEM

This application is a continuation-in-part of application Ser. No. 07/495,497 filed Mar. 19, 1990, now U.S. Pat. No. 5,073,900.

BACKGROUND

The invention relates to communication systems and in particular, to a cellular mobile communications system having integrated satellite and ground nodes.

The cellular communications industry has grown at a fast pace in the United States and even faster in some other countries. It has become an important service of substantial utility and because of the growth rate, saturation of the existing service is of concern. High density regions having high use rates, such as Los Angeles, New York and Chicago are of most immediate concern. Contributing to this concern is the congestion of the electromagnetic frequency spectrum which is becoming increasingly severe as the communication needs of society expand. This congestion is caused not only by cellular communications systems but also by other communications systems. However, in the cellular communications industry alone, it is estimated that the number of mobile subscribers will increase on a world-wide level by an order of magnitude within the next ten years. The radio frequency spectrum is limited and in view of this increasing demand for its use, means to more efficiently use it are continually being explored.

Existing cellular radio is primarily aimed at providing mobile telephone service to automotive users in developed metropolitan areas. For remote area users, airborne users, and marine users, AIRFONE and INMARSAT services exist but coverage is incomplete and service is relatively expensive. Mobile radio satellite systems in an advanced planning stage will probably provide improved direct-broadcast voice channels to mobile subscribers in remote areas but still at significantly higher cost in comparison to existing ground cellular service. The ground cellular and planned satellite technologies complement one another in geographical coverage in that the ground cellular communications service provides voice telephone service in relatively developed urban and suburban areas but not in sparsely populated areas, while the planned earth orbiting satellites will serve the sparsely populated areas. Although the two technologies use the same general area of the RF spectrum, they are basically separate and incompatible by design as they presently exist. At present, if a user needs both forms of mobile communications coverage, he must invest in two relatively expensive subscriber units, one for each system.

The demand for mobile telephone service is steadily expanding and with the expansion of the service, the problem of serving an increased number of subscribers who are travelling from one region to another has become of primary importance. Cellular communications systems divide the service areas into geographical cells, each served by a base station or node typically located at its center. The central node transmits sufficient power to cover its cell area with adequate field strength. If a mobile user moves to a new cell, the radio link is switched to the new node provided there is an available channel. However, if the mobile user travels into a region where all channels are busy, or that is not served by any cellular service, or, in some cases, into an area served by a different licensee/provider, then his call may be abruptly terminated.

Present land mobile communication systems typically use a frequency modulation (FM) approach and because of the limited interference rejection capabilities of FM modulation, each radio channel may be used only once over a wide geographical area encompassing many cells. This means that each cell can use only a small fraction of the total allocated radio frequency band, resulting in an inefficient use of the available spectrum. In some cases, the quality of speech is poor because of the phenomena affecting FM transmission known as fading and "dead spots." The subjective effect of fading is repeated submersion of the voice signal in background noise frequently many times per second if the mobile unit is in motion. The problem is exacerbated by interference from co-channel users in distant cells and resultant crosstalk due to the limited interference rejection capability of FM. Additionally, communications privacy is relatively poor; the FM signal may be heard by others who are receiving that frequency.

In the case where one band of frequencies is preferable over others and that one band alone is to be used for mobile communications, efficient communications systems are necessary to assure that the number of users desiring to use the band can be accommodated. For example, there is presently widespread agreement on the choice of L-band as the technically preferred frequency band for the satellite-to-mobile link in mobile communications systems. In the case where this single band is chosen to contain all mobile communications users, improvements in spectral utilization in the area of interference protection and in the ability to function without imposing intolerable interference on other services will be of paramount importance in the considerations of optimal use of the scarce spectrum.

The spread spectrum communications technique is a technology that has found widespread use in military applications which must meet requirements for security, minimized likelihood of signal detection, and minimum susceptibility to external interference or jamming. In a spread spectrum system, the data modulated carrier signal is further modulated by a relatively wide-band, pseudo-random "spreading" signal so that the transmitted bandwidth is much greater than the bandwidth or rate of the information to be transmitted. Commonly the "spreading" signal is generated by a pseudo-random deterministic digital logic algorithm which is duplicated at the receiver.

By further modulating the received signal by the same spreading waveform, the received signal is remapped into the original information bandwidth to reproduce the desired signal. Because a receiver is responsive only to a signal that was spread using the same unique spreading code, a uniquely addressable channel is possible. Also, the power spectral density is low and without the unique spreading code, the signal is very difficult to detect, much less decode, so privacy is enhanced and interference with the signals of other services is reduced. The spread spectrum signal has strong immunity to multipath fading, interference from other users of the same system, and interference from other systems.

In a satellite communications system, downlink power is an important consideration. Satellite power is severely limited; therefore, the number of users of the satellite that can be accommodated, and consequently the economic viability of such a system, is in inverse proportion to how much satellite transmitter power must be allocated to each user. Many of the proposed mobile communications satellite systems have relied upon user antenna directivity to provide additional effective power gain. This has resulted in significant user equipment expense and the operational inconvenience of having to perform some steering or selection of the antenna to point at the satellite. Additionally, hand held transceivers are impractical because of the relatively large directive antennas required.

In some ground cellular service, the user transceiver commonly radiates at a power level which is 30 to 40 dB greater than is required on the average in order to overcome fading nulls. This results in greatly increased inter-system interference and reduced battery life. It would also be desirable to provide a power control system to compensate for fading and interference without exceeding the minimum amount of power necessary to overcome such interference.

Additionally, a user position determination capability would be useful for certain applications of a cellular communications system such as tracking the progress of commercial vehicles en route. A further use may be to provide users with an indication of their own position. Such a capability would be more useful with increased accuracy.

Thus it would be desirable to provide a cellular communications system which integrates satellite nodes with surface nodes to provide coverage of greater surface areas without requiring the use of two different systems with attendant expense and hardware requirements. Additionally, it would be desirable to provide a cellular communications system using a spread spectrum technique which can make more efficient use of existing frequency spectrum resources and result in increased privacy in communications. Additionally, it would be desirable to permit the use of a relatively low power, compact and mobile user handset having a small, non-directional antenna, one which can communicate with both the land-based stations and the satellite-based stations.

SUMMARY OF THE INVENTION

The invention provides a cellular communications system having both surface and space nodes which are fully integrated. Areas where surface nodes are impractical are covered by a space node. Space nodes comprise satellites which establish cells which in many cases overlap ground cells. A spread spectrum communications method is used which includes code division multiple access (CDMA) and forward error correction coding (FECC) techniques to increase the number of users that can be accommodated within the allocated spectrum. The spread spectrum system makes possible the use of very low rate, highly redundant coding without loss of capability to accommodate the largest possible number of users within the allocated bandwidth. The low rate coding in turn provides maximum possible coding gain, minimizing the required signal strength at the receiver and maximizing the number of users that can be served in a given frequency band.

Relatively high gain, multiple-beam antennas are used on the satellites and in one embodiment, antennas having a relatively large reflector with a multiple element feed positioned in the focal plane of the reflector are used. By coupling a high gain antenna with the extra gain obtained with FECC, enough gain exists in the system such that the user unit comprises only a small, mobile handset with a small, non-directional antenna.

An adaptive transmitter power control system compensates for received signal strength variations, such as those caused by buildings, foliage and other obstructions. A path loss estimate is derived from the received signal strength and from data included in each transmitted signal which indicates that transmitter's output power. Based on the derived path loss and the transmitter's power level data, the receiver can then adjust the power output of its own associated transmitter accordingly.

In one embodiment, a system network control center is used to coordinate system-wide operations, to keep track of user locations, to perform optimum allocation of system resources to each call, dispatch facility command codes, and monitor and supervise overall system health. Overall system control is of a hierarchical nature in this embodiment comprising the system network control center, regional node control centers which coordinate the detailed allocation of ground network resources within a region, and one or more satellite node control centers responsible for allocation of resources among the satellite network resources. In another embodiment, the system does not include a system network control center and the node control centers operate autonomously.

In one embodiment, one or more satellite node control centers serve a multiplicity, M, of satellite cells comprising a "cluster." In this embodiment, the M composite signals to and from the various cluster member cells are frequency multiplexed onto the common backhaul link, and are separated by frequency demultiplex at the one or more satellite node control centers serving the cluster. In this embodiment, the number M of cells in the cluster is a design variable which can range between one and the total number of cells in the system. This can be optimized for each particular cluster region depending upon available backhaul multiplex bandwidth and local telephone company intra-regional call rates.

In another aspect of the invention, an inter-cell bus system is provided in which a user's uplink communication with a satellite in one cell may be simultaneously downlinked to all cells of the same satellite on the bus.

In yet another aspect of the invention, position determination of a user is provided by monitoring the user response signal to a polling or other signal transmitted by the position locating equipment. Time differences of arrival at several nodes provide the data basis for determining the location of the particular user.

BRIEF DESCRIPTION OF THE DRAWINGS

FIG. 6 is a block diagram of one embodiment of satellite signal processing in the system of FIG. 5;

FIG. 7 is a functional block diagram of a user transceiver showing an adaptive power control system; and FIGS. 8a through 8h show timing diagrams of an adaptive, two-way power control system.

DETAILED DESCRIPTION OF THE PREFERRED EMBODIMENTS

As is shown in the exemplary drawings, the invention is embodied in a cellular communications system utilizing integrated satellite and ground nodes both of which use the same modulation, coding, and spreading structure and both responding to an identical user unit.

Figure 1:
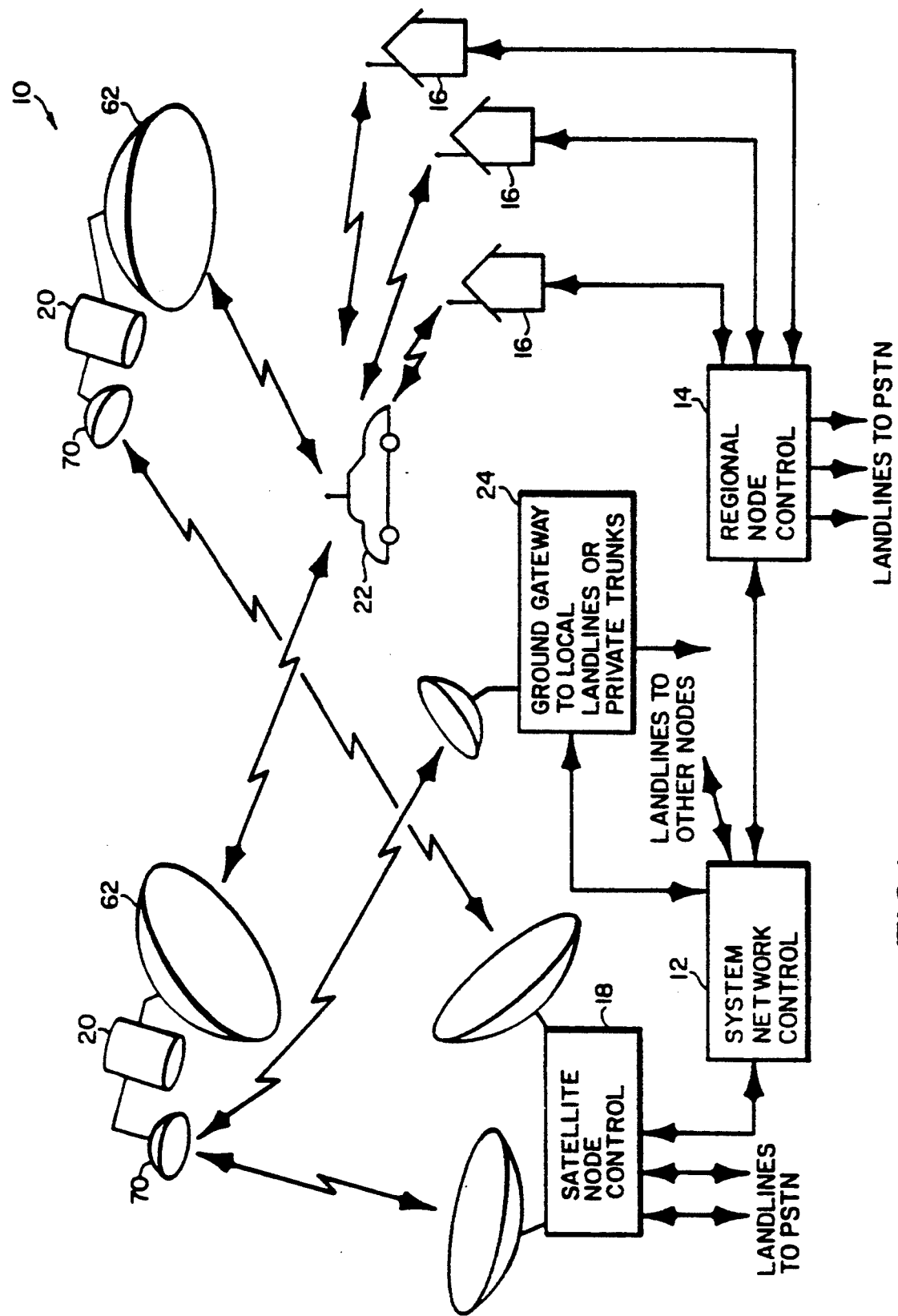
FIG. 1 is a block diagram showing an overview of the principal elements of a communications system in accordance with the principles of the invention.

Referring now to FIG. 1, an overview of a communications system 10 is presented showing the functional inter-relationships of the major elements. The system network control center 12 directs the top level allocation of calls to satellite and ground regional resources throughout the system. It also is used to coordinate system-wide operations, to keep track of user locations, to perform optimum allocation of system resources to each call, dispatch facility command codes, and monitor and supervise overall system health. The regional node control centers 14, one of which is shown, are connected to the system network control center 12 and direct the allocation of calls to ground nodes within a major metropolitan region. The regional node control center 14 provides access to and from fixed land communication lines, such as commercial telephone systems known as the public switched telephone network (PSTN). The ground nodes 16 under direction of the respective regional node control center 14 receive calls over the fixed land line network encode them, spread them according to the unique spreading code assigned to each designated user, combine them into a composite signal, modulate that composite signal onto the transmission carrier, and broadcast them over the cellular region covered.

Satellite node control centers 18 are also connected to the system network control center 12 via status and control land lines or other means and similarly handle calls designated for satellite links such as from the PSTN, encode them, spread them according to the unique spreading codes assigned to the designated users, and multiplex them with other similarly directed calls into an uplink trunk, which is beamed up to the designated satellite 20. Satellite nodes 20 receive the uplink trunks, frequency demultiplex the calls intended for different satellite cells, frequency translate and direct each to its appropriate cell transmitter and cell beam, and broadcast the composite of all such similarly directed calls down to the intended satellite cellular area. As used herein, "backhaul" means the link between a satellite 20 and a satellite node control center 18. In one embodiment, it is a K-band frequency while the link between the satellite 20 and the user unit 22 uses an L-band or an S-band frequency.

User units 22 respond to signals of either satellite or ground node origin, receive the outbound composite signal, separate out the signal intended for that user by despreading using the user's assigned unique spreading code, de-modulate, and decode the information and deliver the call to the user. Such user units 22 may be mobile or may be fixed in position. Gateways 24 provide direct trunks, that is, groups of channels, between satellite and the ground public switched telephone system or private trunk users. For example, a gateway may comprise a dedicated satellite terminal for use by a large company or other entity. In the embodiment of FIG. 1, the gateway 24 is also connected to that system network controller 12.

All of the above-discussed centers, nodes, units and gateways are full duplex transmit/receive performing the corresponding inbound (user to system) link functions as well in the inverse manner to the outbound (system to user) link functions just described.

Figure 2:
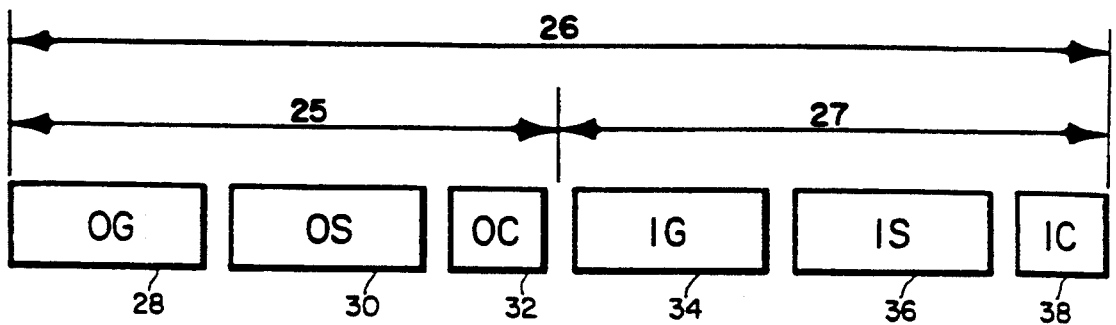
FIG. 2 is a diagram of the frequency sub-bands of the frequency band allocation for a cellular system.

Referring now to FIG. 2, the allocated frequency band 26 of a communications system is shown. The allocated frequency band 26 is divided into 2 main sub-bands, an outgoing sub-band 25 and an incoming sub-band 27. Additionally the main sub-bands are themselves divided into further sub-bands which are designated as follows:

OG: Outbound Ground 28 (ground node to user)
OS: Outbound Satellite 30 (satellite node to user)
OC: Outbound Calling and Command 32 (node to user)
IG: Inbound Ground 34 (user to ground node)
IS: Inbound Satellite 36 (user to satellite node)
IC: Inbound Calling and Tracking 38 (user to node)

All users in all cells use the entire designated sub-band for the described function. Unlike existing ground or satellite mobile systems, there is no necessity for frequency division by cells; all cells may use these same basic six sub-bands. This arrangement results in a higher frequency reuse factor as is discussed in more detail below.

In one embodiment, a mobile user's unit 22 will send an occasional burst of an identification signal in the IC sub-band either in response to a poll or autonomously. This may occur when the unit 22 is in standby mode. This identification signal is tracked by the regional node control center 14 as long as the unit is within that respective region, otherwise the signal will be tracked by the satellite node or nodes. In another embodiment, this identification signal is tracked by all ground and satellite nodes capable of receiving it. This information is forwarded to the network control center 12 via status and command lines or other means. By this means, the applicable regional node control center 14 and the system network control center 12 remain constantly aware of the cellular location and link options for each active user 22. An intra-regional call to or from a mobile user 22 will generally be handled solely by the respective regional node control center 14. Inter-regional calls are assigned to satellite or ground regional system resources by the system network control center 12 based on the location of the parties to the call, signal quality on the various link options, resource availability and best utilization of resources.

A user 22 in standby mode constantly monitors the common outbound calling frequency sub-band OC 32 for calling signals addressed to him by means of his unique spreading code. Such calls may be originated from either ground or satellite nodes. Recognition of his unique call code initiates the user unit 22 ring function. When the user goes "off-hook", e.g. by lifting the handset from its cradle, a return signal is broadcast from the user unit 22 to any receiving node in the user calling frequency sub-band IC 38. This initiates a handshaking sequence between the calling node and the user unit which instructs the user unit whether to transition to either satellite, or ground frequency sub-bands, OS 30 and IS 36 or OG 28 and IG 34.

A mobile user wishing to place a call simply takes his unit 22 off hook and dials the number of the desired party, confirms the number and "sends" the call. Thereby an incoming call sequence is initiated in the IC sub-band 38. This call is generally heard by several ground and satellite nodes which forward call and signal quality reports to the appropriate system network control center 12 which in turn designates the call handling to a particular satellite node 20/satellite node control center 18 or regional node control center 14 or both. The call handling element then initiates a handshaking function with the calling unit over the OC 32 and IC 38 sub-bands, leading finally to transition to the appropriate satellite or ground sub-bands for communication.

Figure 3:
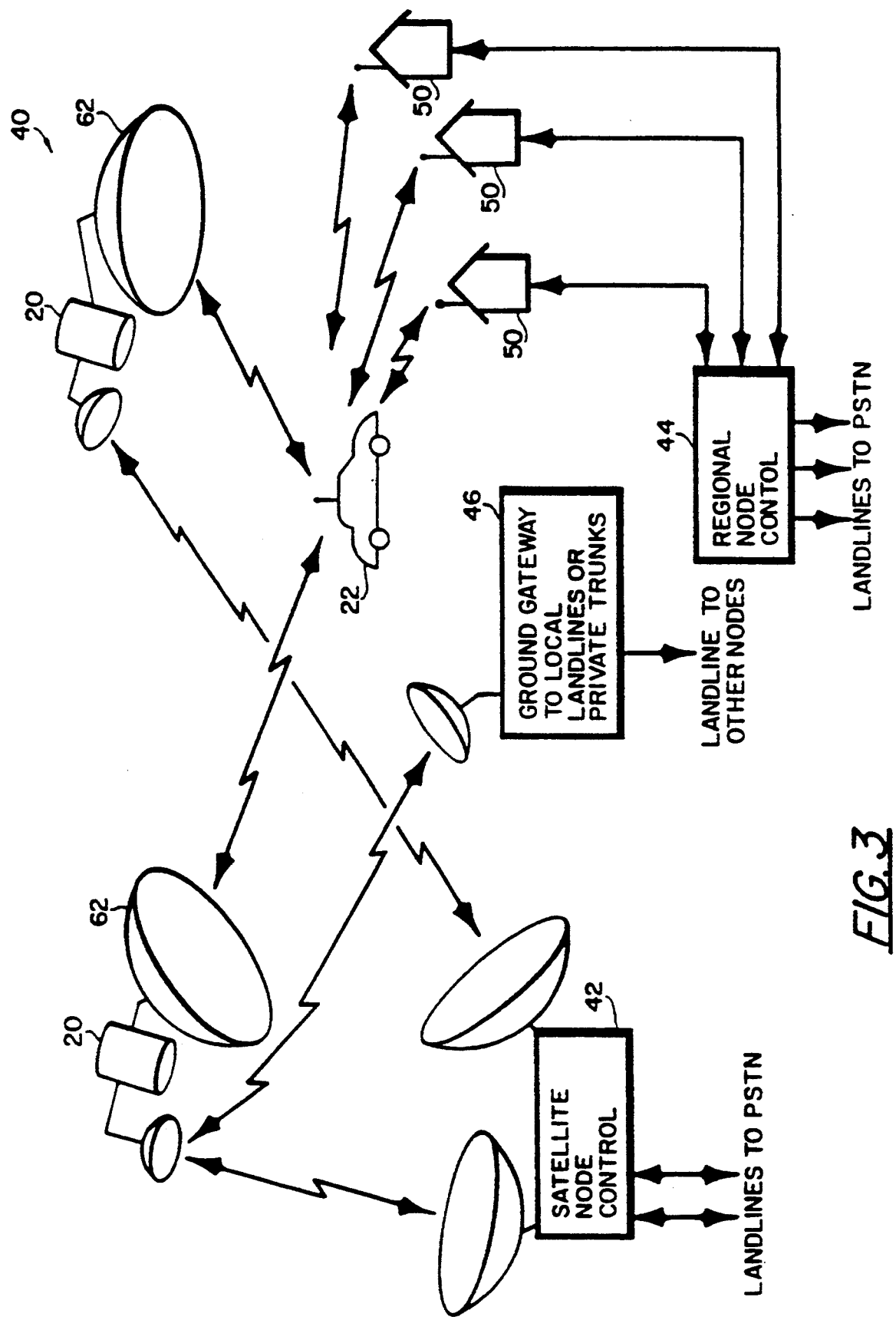
FIG. 3 is a overview block diagram of a communications system in accordance with the principles of the invention without a network control center.

Referring now to FIG. 3, a block diagram of a communications system 40 which does not include a system network control center is presented. In this system, the satellite node control centers 42 are connected directly into the land line network as are also the regional node control centers 44. Gateway systems 46 are also available as in the system of FIG. 1. and connect the satellite communications to the appropriate land line or other communications systems. The user unit 22 designates satellite node 20 communication or ground node 50 communication by sending a predetermined code.

Figure 4:
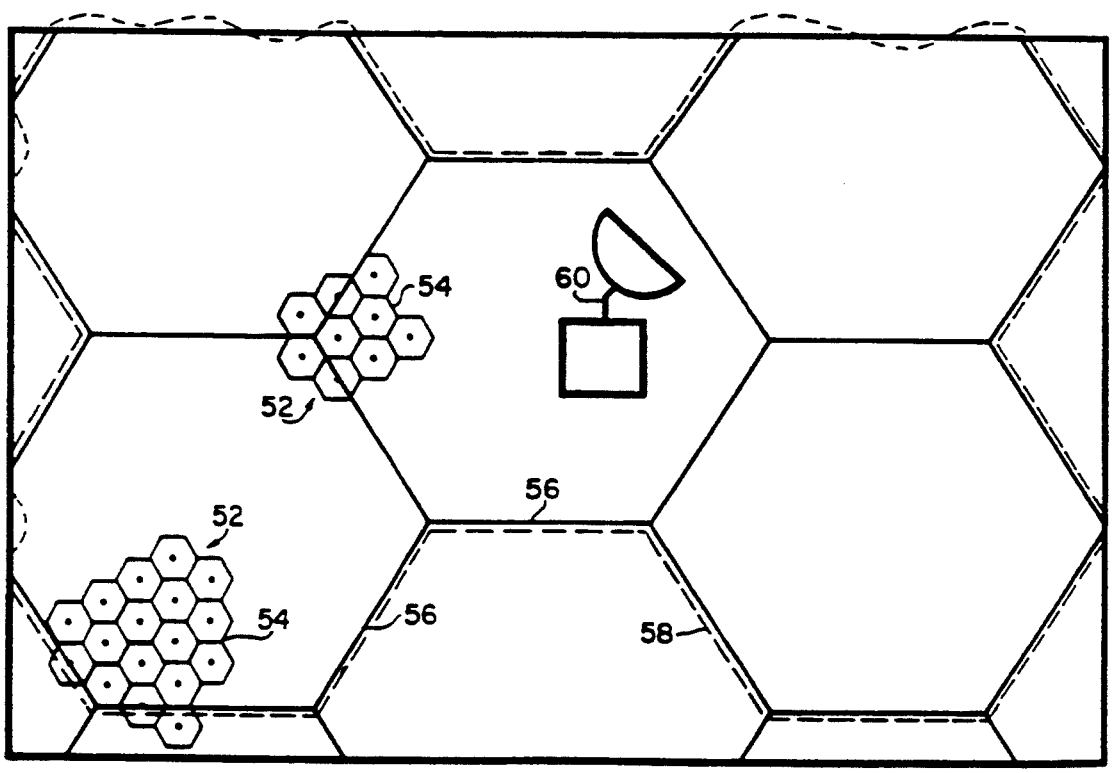
FIG. 4 is a diagram showing the interrelationship of the cellular hierarchical structure of the ground and satellite nodes in a typical section and presents a cluster comprising more than one satellite cell.

Referring now to FIG. 4, a hierarchical cellular structure is shown. A pair of clusters 52 of ground cells 54 are shown. Additionally, a plurality of satellite cells 56 are shown. Although numerals 54 and 56 point only to two cells each, this has been done to retain clarity in the drawing. Numeral 54 is meant to indicate all ground cells in the figure and similarly numeral 56 is meant to indicate all satellite cells. The cells are shown as hexagonal in shape, however, this is exemplary only. The ground cells may be from 3 to 15 km across although other sizes are possible depending on user density in the cell. The satellite cells may be approximately 200–500 km across as an example depending on the number of beams used to cover a given area. As shown, some satellite cells may include no ground cells. Such cells may cover undeveloped areas for which ground nodes are not practical. Part of a satellite cluster 58 is also shown. The cell members of such a cluster share a common satellite node control center 60.

A significant advantage of the invention is that by the use of spread spectrum multiple access, adjacent cells are not required to use different frequency bands. All ground-user links utilize the same two frequency sub-bands (OG 28, IG 34) and all satellite-user links use the same two frequency sub-bands (OS 30, IS 36). This obviates an otherwise complex and restrictive frequency coordination problem of ensuring that frequencies are not reused within cells closer than some minimum distance to one another (as in the FM approach), and yet provides for a hierarchical set of cell sizes to accommodate areas of significantly different subscriber densities.

Referring again to FIG. 1 as well as to FIG. 4, the satellite nodes 20 make use of large, multiple-feed antennas 62 which in one embodiment provide separate beams and associated separate transmitters for each satellite cell 56. For example, the multiple feed antenna 62 may cover an area such as the United States with, typically, about 100 satellite beams/cells and in one embodiment, with about 200 beams/cells. The combined satellite/ground nodes system provides a hierarchical geographical cellular structure. Thus within a dense metropolitan area, each satellite cell 56 may further contain as many as 100 or more ground cells 54, which ground cells would normally carry the bulk of the traffic originated therein. The number of users of the ground nodes 16 is anticipated to exceed the number of users of the satellite nodes 20 where ground cells exist within satellite cells. Because all of these ground node users would otherwise interfere as background noise with the intended user-satellite links, in one embodiment the frequency band allocation may be separated into separate segments for the ground element and the space element as has been discussed in connection with FIG. 2. This combined, hybrid service can be provided in a manner that is smoothly transparent to the user. Calls will be allocated among all available ground and satellite resources in the most efficient manner by the system network control center 12.

An important parameter in most considerations of cellular radio communications systems is the "cluster", defined as the minimal set of cells such that mutual interference between cells reusing a given frequency sub-band is tolerable provided that such "co-channel cells" are in different clusters. Conversely all cells within a cluster must use different frequency sub-bands. The number of cells in such a cluster is called the "cluster size". It will be seen that the "frequency reuse factor", i.e., the number of possible reuses of a frequency sub-band within the system is thus equal to the number of cells in the system divided by the cluster size. The total number of channels that can be supported per cell, and therefore overall bandwidth efficiency of the system is thus inversely proportional to the cluster size. By means to be described, the invention system achieves a minimum possible cluster size of one as compared to typically 7 to 13 for other ground or satellite cellular concepts and thereby a maximum possible frequency reuse factor. This is a major advantage of the invention.

Figure 5:
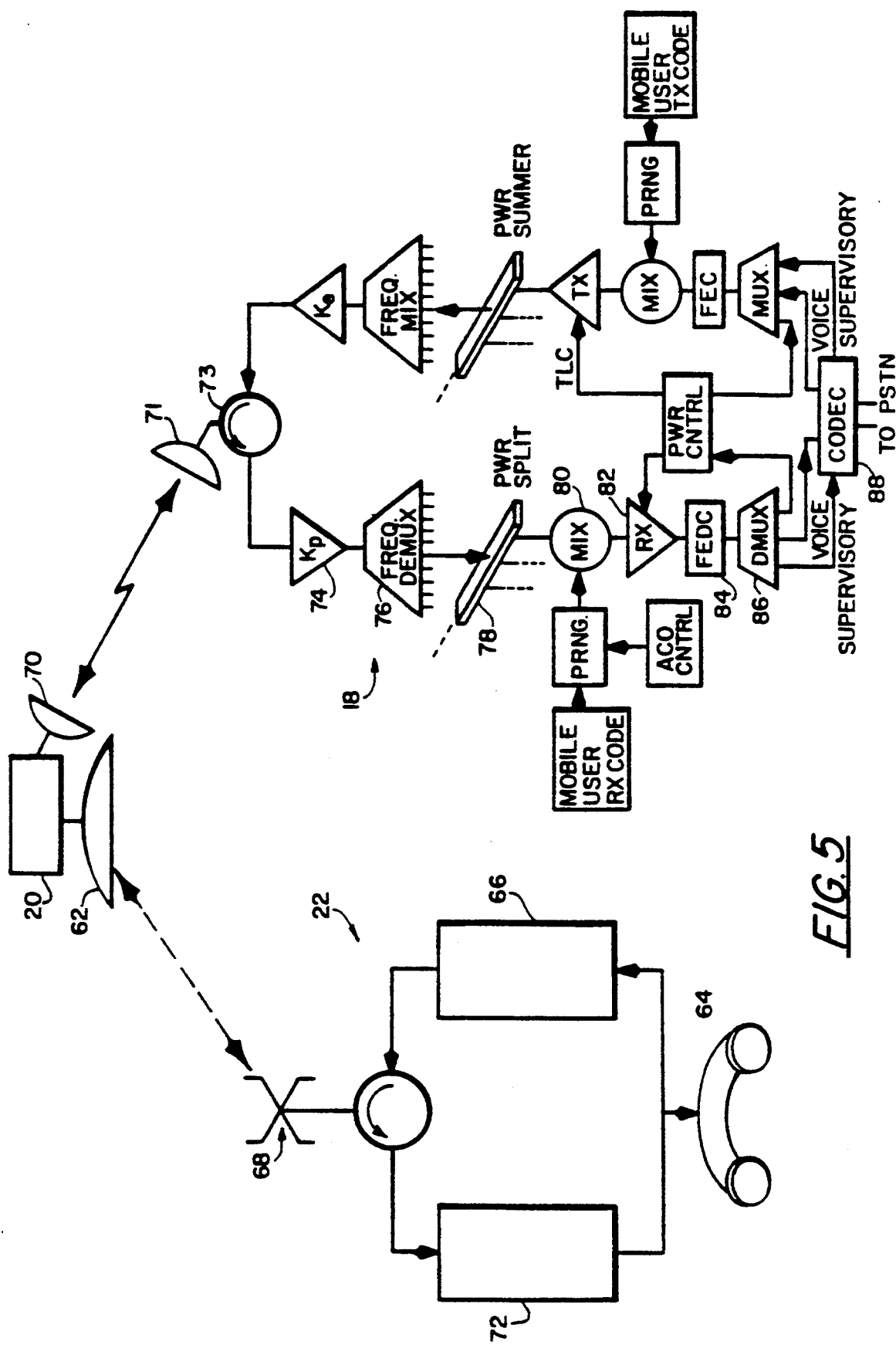
FIG. 5 is a block diagram of a satellite link system showing the user unit and satellite node control center.

Referring now to FIG. 5, a block diagram is shown of a typical user unit 22 to satellite 20 to satellite node control 18 communication and the processing involved in the user unit 22 and the satellite node control 18. In placing a call for example, the handset 64 is lifted and the telephone number entered by the user. After confirming a display of the number dialed, the user pushes a "send" button, thus initiating a call request signal. This signal is processed through the transmitter processing circuitry 66 which includes spreading the signal using a calling spread code. The signal is radiated by the omni-directional antenna 68 and received by the satellite 20 through its narrow beamwidth antenna 62. The satellite processes the received signal as will be described below and sends the backhaul to the satellite node control center 18 by way of its backhaul antenna 70. On receive, the antenna 68 of the user unit 22 receives the signal and the receiver processor 72 processes the signal. Processing by the user unit 22 will be described in more detail below in reference to FIG. 7.

The satellite node control center 18 receives the signal at its antenna 71, applies it to a circulator 73, amplifies 74, frequency demultiplexes 76 the signal separating off the composite signal which includes the signal from the user shown in FIG. 5, splits it 78 off to one of a bank of code correlators, each of which comprises a mixer 80 for removing the spreading and identification codes, an AGC amplifier 82, the FEC decoder 84, a demultiplexer 86 and finally a voice encoder/decoder (CODEC) 88 for converting digital voice information into an analog voice signal. The voice signal is then routed to the appropriate land line, such as a commercial telephone system. Transmission by the satellite node control center 18 is essentially the reverse of the above described reception operation.

Referring now to FIG. 6, the satellite transponder 90 of FIG. 5 is shown in block diagram form. A circulator/diplexer 92 receives the uplink signal and applies it to an L-band or S-band amplifier 94 as appropriate. The signals from all the M satellite cells within a "cluster" are frequency multiplexed 96 into a single composite K-band backhaul signal occupying M times the bandwidth of an individual L-/S-band mobile link channel. The composite signal is then split 98 into N parts, separately amplified 100, and beamed through a second circulator 102 to N separate satellite ground cells. This general configuration supports a number of particular configurations various of which may be best adapted to one or another situation depending on system optimization which for example may include considerations related to regional land line long distance rate structure, frequency allocation and subscriber population. Thus, for a low density rural area, one may utilize an M-to-1 (M>1, N=1) cluster configuration of M contiguous cells served by a single common satellite ground node with M limited by available bandwidth. In order to provide high-value, long distance service between metropolitan areas already or best covered for local calling by ground cellular technology, an M-to-M configuration would provide an "inter-metropolitan bus" which would tie together all occupants of such M satellite cells as if in a single local calling region. To illustrate, the same cells (for example, Seattle, Los Angeles, Omaha and others) comprising the cluster of M user cells on the left side of FIG. 6, are each served by corresponding backhaul beams on the right side of FIG. 6.

Referring now to FIG. 7, a functional block diagram of a typical user unit 22 is shown. The user unit 22 comprises a small, light-weight, low-cost, mobile transceiver handset with a small, non-directional antenna 68. The single antenna 68 provides both transmit and receive functions by the use of a circulator/diplexer 104 or other means. It is fully portable and whether stationary or in motion, permits access to a wide range of communication services from one telephone with one call number. It is anticipated that user units will transmit and receive on frequencies in the 1-3 Ghz band but can operate in other bands as well.

The user unit 22 shown in FIG. 7 comprises a transmitter section 106 and a receiver section 108. For the transmission of voice communication, a microphone couples the voice signal to a voice encoder 110 which performs analog to digital encoding using one of the various modern speech coding technologies well known to those skilled in the art. The digital voice signal is combined with local status data, and/or other data, facsimile, or video data forming a composite bit stream in digital multiplexer 112. The resulting digital bit stream proceeds sequentially through forward error encoder 114, symbol or bit interleaver 116, symbol or bit, phase, and/or amplitude modulator 118, narrow band IF amplifier 120, wideband multiplier or spreader 122, wide band IF amplifier 124, wide band mixer 126, and final power amplifier 128. Oscillators or equivalent synthesizers derive the bit or baud frequency 130, pseudo-random noise or "chip" frequency 132, and carrier frequency 134. The PRN generator 136 comprises deterministic logic generating a pseudo-random digital bit stream capable of being replicated at the remote receiver. The ring generator 138 on command generates a short pseudo-random sequence functionally equivalent to a "ring."

The transceiver receive function 108 demodulation operations mirror the corresponding transmit modulation functions in the transmitter section 106. The signal is received by the non-directional antenna 68 and conducted to the circulator 104. An amplifier 142 amplifies the received signal for mixing to an IF at mixer 144. The IF signal is amplified 146 and multiplied or despread 148 and then IF amplified 150 again. The IF signal then is conducted to a bit or symbol detector 152 which decides the polarity or value of each channel bit or symbol, a bit or symbol de-interleaver 154 and then to a forward error decoder 156. The composite bit stream from the FEC decoder 156 is then split into its several voice, data, and command components in the de-multiplexer 158. Finally a voice decoder 160 performs digital to analog converting and results in a voice signal for communication to the user by a speaker or other means. Local oscillator 162 provides the first mixer 144 LO and the bit or symbol detector 152 timing. A PRN oscillator 164 and PRN generator 166 provide the deterministic logic of the spread signal for despreading purposes. The baud or bit clock oscillator 168 drives the bit in the bit detector 152, forward error decoder 156 and the voice decoder 160.

The bit or symbol interleaver 116 and de-interleaver 154 provide a type of coded time diversity reception which provides an effective power gain against multipath fading to be expected for mobile users. Its function is to spread or diffuse the effect of short bursts of channel bit or symbol errors so that they can more readily be corrected by the error correction code.

As an alternative mode of operation, provision is made for direct data or facsimile or other digital data input 170 to the transmitter chain and output 172 from the receiver chain.

A command decoder 174 and command logic element 176 are coupled to the forward error decoder 156 for receiving commands or information. By means of special coding techniques known to those skilled in the art, the non-voice signal output at the forward error decoder 156 may be ignored by the voice decoder 160 but used by the command decoder 174. An example of the special coding techniques are illustrated in FIG. 7 by the MUX 112 and DEMUX 158.

As shown, acquisition, control and tracking circuitry 178 are provided in the receiver section 108 for the three receive side functional oscillators 162, 164, 168 to acquire and track the phase of their counterpart oscillators in the received signal. Means for so doing are well known to those skilled in the art.

The automatic gain control (AGC) voltage 184 derived from the received signal is used in the conventional way to control the gain of the preceding amplifiers to an optimum value and in addition as an indicator of short term variations of path loss suffered by the received signal. By means to be described more in detail below, this information is combined with simultaneously received digital data 186 in a power level controller 188 indicating the level at which the received signal was originally transmitted to command the local instantaneous transmit power level to a value such that the received value at the satellite node control is approximately constant, independent of fading and shadowing effects. The level commanded to the output power amplifier 128 is also provided 190 to the transmitter multiplexer 112 for transmission to the corresponding unit.

In mobile and other radio applications, fading, shadowing, and interference phenomena result in occasional, potentially significant steep increases of path loss. In order to insure that the probability that such a fade will be disruptive is acceptably low, conventional design practice is to provide a substantial excess power margin by transmitting a power which is normally as much as 10 to 40 dB above the average requirement. But this causes correspondingly increased battery usage, inter-system, and intra-system interference. In a CDMA application, this can drastically reduce the useful circuit capacity of the channel.

A further feature of a system in accordance with the principles of the invention is an adaptive control which continually maintains each transmitted signal power at a minimum necessary level, adapting rapidly to and accommodating such fades dynamically, and only as necessary. Each transmitter telemeters its current signal output level to the counterpart far end receiver by adding a low rate data stream to the composite digital output signal. Using this information along with the measured strength of the received signal and assuming path loss reciprocity, each end can form an estimate of the instantaneous path loss and adjust its current transmit power output to a level which will produce an approximately constant received signal level at the counterpart receiver irrespective of path loss variations.

Referring now to FIGS. 8a through 8h, timing and waveform diagrams of an adaptive power control system in accordance with the principles of the invention are presented. In this example, the two ends of the communications link are referred to generally as A and B. In the ground cellular application, "A" corresponds to the user and "B" corresponds to the cellular node. In the satellite link, A would be the user and B would be the satellite control node; in this case, the satellite is simply a constant gain repeater and the control of its power output is exercised by the level of the signal sent up to it.

In the example of FIG. 8a, at time 192, the path loss suddenly increases x dB due for example to the mobile user A driving behind a building or other obstruction in the immediate vicinity of A. This causes the signal strength as sensed by A's AGC to decrease x dB as shown in FIG. 8b. The telemetered data at time 192 shown in FIG. 8c indicates that the level at which this signal has been transmitted from B had not been altered, A's power level controller 188 subtracts the telemetered transmitted signal level from the observed received signal level and computes that there has been an increase of x dB in path loss. Accordingly it increases its signal level output by x dB at time 192 as shown in FIG. 8d and at the same time adds this information to its status telemeter channel.

This signal is transmitted to B, arriving after transit time T as shown in FIG. 8e. The B receiver sees a constant received signal strength as shown in FIG. 8f but learns from the telemetered data channel as shown in FIG. 8g that the signal has been sent to him at +x dB. Therefore, B also computes that the path loss has increased x dB, adjusts its output signal level accordingly at FIG. 8h and telemeters that information. That signal increase arrives back at station A at 2 T as shown in FIG. 8e thus restoring the nominal signal strength with a delay of two transit times (T). Thus for a path loss variation occurring in the vicinity of A, the path loss compensation at B is seen to be essentially instantaneous while that at A occurs only after a two transit time delay, 2 T.

Referring again to FIG. 7, an arrangement is provided for generating call requests and detecting ring signals. The ring generator 138 generates a ring signal based on the user's code for calling out with the user unit 22. For receiving a call, the ring signal is detected in a fixed matched filter 198 matched to a short pulse sequence which carries the user's unique code. By this means each user can be selectively called. As an option, the ring detect and call request signals may be utilized in poll/response mode to provide tracking information on each active or standby mode user. Course tracking information, adequate for management of the call routing functions is provided by comparison of signal quality as received at various modes. For the precision location option, the user response signal time is accurately locked to the time of receipt of the timing (polling) signal which establishes a uniquely identifiable timing epoch, to a fraction of a PRN chip width. Measurement of the round trip poll/response time from two or more nodes or time differences of arrival at several nodes provides the basic measurement that enable solution and provision of precise user position. Ground and satellite transmitters and receivers duplicate the functions summarized above for the user units. Given a priori information, a single round trip poll/response time measurement from a single node can yield valuable user position information.

The command logic 176 is further coupled to the receiver AGC 180, the matched filter ring detector (RD) 198, the acquisition and tracking circuitry 178, the transmit local oscillator (LO) 162 and the ring generator (RG) 138 to command various modes of operation.

The economic feasibility of a mobile telephone system is related to the number of users that can be supported. Two significant limits on the number of users supported are bandwidth utilization efficiency and power efficiency. In regard to bandwidth utilization efficiency, in either the ground based cellular or mobile satellite elements, radio frequency spectrum allocation is a severely limited commodity. Measures incorporated in the invention to maximize bandwidth utilization efficiency include the use of code division multiple access (CDMA) technology which provides an important spectral utilization efficiency gain and higher spatial frequency reuse factor made possible by the use of smaller satellite antenna beams. In regard to power efficiency, which is a major factor for the satellite-mobile links, the satellite transmitter source power per user is minimized by the use of forward-error-correcting coding, which in turn is enabled by the above use of spread spectrum code division multiple access (SS/CDMA) technology and by the use of relatively high antenna gain on the satellite. CDMA and forward-error-correction coding are known to those skilled in the art and no further details are given here.

The issue of band width utilization efficiency will now be considered in detail. The major contribution of SS/CDMA to spectral efficiency is closely related to the concept of cellular "cluster". In existing Frequency Division or Time division multiple access technology, a given frequency or time slot allocation must be protected from interference from nearby cells by users on the same frequency sub-band. Depending on the degree of protection required, it may be necessary to preclude the reuse of the cell "X" frequencies on a number of cells, N, surrounding "X". That number is called the "cluster size." Because each cell can then utilize only one Nth of the total allocatable channels, it will be seen, all other things being equal, that the "frequency reuse factor" and spectral utilization efficiency are inversely proportional to the cluster size, N.

Field tests of the FM-frequency division multiplex ground cellular system, Macdonald, V. H., *The Cellular Concept*, Bell Systems Technical Journal, p. 15, January 1979, determined that a signal-to-interference ratio of 17 dB or better is required for good to excellent quality to be perceived by most listeners. This, combined with progagation and fading studies, yielded the criterion that the separation between co-channel sites should be at least 6.0 times the maximum distance to a user within the cell using omni-directional antennas at the ground nodes. In order to achieve this separation, the cluster size must be at least N=12 cells per cluster. Thus one may use only 1/12 of the total allocatable capacity per cell.

In satellite service, the minimum cell size is inversely proportional to the satellite dish diameter. For a given maximum feasible dish diameter, the number of available channels is strictly limited by the cluster size. In the planned AMSC system, C. E. Agnew et al., *The AMSC Mobile Satellite System*, Proceedings of the Mobile Satellite Conference, NASA, JPL, May 1988, the effective cluster size is 5, and one may use only 1/5 or the total allocatable capacity per cell.

In a system in accordance with the invention, the cluster size is one. That is, each cell uses the same, full allocated frequency band. This is possible because of the strong interference rejection properties of spread spectrum code division multiple access technology (SS/CDMA). The effect of users in adjacent cells using the same band is qualitatively no different than that of other users in the same cell, so may be taken into account as an effective reduction in the number of users that can be tolerated within a cell. The cumulative effect of all such other-cell interferers may be calculated on the assumption of uniform density of users and a distance attenuation law appropriate to the case of ground propagation or satellite beam pattern. Doing so, we find the multiplying factor for the ratio of total interference to in-cell origin interference of 1.4 for ground propagation and 2.0 for the satellite system. This factor may be accounted for as a multiplier equivalent in effect to an effective cluster size for the CDMA system. Thus, finally, it is believed that in comparison with other systems we find frequency reuse factor or bandwidth utilization efficiency factors inversely proportional to effective cluster size in the ratios:

0.71:0.5:0.2:0.08 for respectively the ground cellular component of the invention, satellite cellular component of the invention, the AMSC mobile satellite concept, and current ground cellular technology.

The second severely limited commodity in the satellite links is satellite prime power, a major component of the weight of a communication satellite and thereby a major factor in satellite cost. Generally in systems such as this, the down links to individual users are the largest power consumers and thus for a limited satellite source power, may provide the limiting factor on the number of users that can be served. Thus it is important to design the system for minimum required power per user.

This requirement is addressed in the invention in four ways. In the invention the system envisages the use of the highest feasible satellite antenna gain. In one embodiment, power gain on the order of 45 dB and beamwidth of under one-degree are envisioned at L-band. This is accomplished by an antenna size of approximately 20 meters. An antenna having a parabolic reflector with an offset feed located in the focal region of the reflector is used in one embodiment. The diameter of the rim of the reflector is approximately 20 meters and at S-band, a beamwidth of approximately 0.4 degrees results for each of the beams. As used herein, the expression "relatively narrow beamwidth" means a beamwidth resulting in a satellite cell at approximately 200 to 500 km across.

Secondly, by virtue of the use of the spread spectrum technique, very low rate high gain coding is available without penalty in terms of increased bandwidth occupancy.

Thirdly, the system utilizes channel bit interleaving/de-interleaving, a kind of coded time diversity to provide power gain against deep fading nulls. This makes it possible to operate at relatively low bit energy to noise density ratio, on the order of 3 dB. This in turn reflects in minimum satellite power requirement per user.

Fourthly, two-way, adaptive power control as previously described obviates the usual practice of continuously transmitting at a power level which is 10 to 40 dB greater than required most of the time in order to provide a margin for accommodating infrequent deep fades.

In addition to the above listed advantages, the Code Division Multiplex system has the following important advantages in the present system. Blank time when some of the channels are not in use reduces the average interference background. In other words, the system overloads and underloads gracefully. The system inherently provides flexibility of base band rates; as opposed to FDM systems, signals having different baseband rates can be multiplexed together on an ad-hoc basis without complex preplanned and restrictive sub-band allocation plans. Not all users need the same baseband rate. Satellite antenna sidelobe control problems are significantly reduced. The above mentioned numerical studies of out-of-cell interference factors show that secondary lobe responses may effectively be ignored. Co-code reassignment (that is reuse of the same spreading code) is feasible with just one beam separation. However, because there are effectively (i.e. including phasing as a means of providing independent codes) an unlimited number of channel codes, the requirements on space division are eased; there is no need to reuse the same channel access i.e., spreading code.

By virtue of the above discussed design factors the system in accordance with the invention provides a flexible capability of providing the following additional special services: high quality, high rate voice and data service; facsimile (the standard group 3 as well as the high speed group 4); two way messaging, i.e. data interchange between mobile terminals at variable rates; automatic position determination and reporting to within several hundred feet; paging rural residential telephone; and private wireless exchange.

It is anticipated that the satellite will utilize geostationary orbits but is not restricted to such. The invention permits operating in other orbits as well. The system network control center 12 is designed to normally make the choice of which satellite or ground node a user will communicate with. In another embodiment, as an option, the user can request his choice between satellite link or direct ground based link depending on which provides clearer communications at the time or request his choice based on other communication requirements.

While a satellite node has been described above, it is not intended that this be the only means of providing above-ground service. In the case where a satellite has failed or is unable to provide the desired level of service for other reasons, for example, the satellite has been jammed by a hostile entity, an aircraft or other super-surface vehicle may be commissioned to provide the satellite functions described above. The "surface" nodes described above may be located on the ground or in water bodies on the surface of the earth. Additionally, while users have been shown and described as being located in automobiles, other users may exist. For example, a satellite may be a user of the system for communicating signals, just as a ship at sea may or a user on foot.

While several particular forms of the invention have been illustrated and described, it will be apparent that various modifications can be made without departing from the spirit and scope of the invention. Accordingly, it is not intended that the invention be limited, except by the appended claims.

What is claimed is:

1. A cellular communications system comprising:
   at least one space node having a multiple beam antenna positioned so to establish a first set of cells, each space node including means for transmitting and receiving different predetermined sets of code division multiple access coded, spread spectrum waveforms digitally modulated and incorporating forward error correction coding with the waveforms being located in a predetermined frequency band common to all space nodes;
   the antenna having a reflector with a multiple element feed disposed in the focal region of the reflector;
   at least one surface node positioned so to establish a second set of cells, each surface node including means for transmitting and receiving the predetermined sets of code division multiple access coded, spread spectrum waveforms in the predetermined frequency band; and
   a plurality of user units within the cells, each unit including means for communicating with each satellite node and with each surface node and being operatively responsive to a predetermined one of the sets of code division multiple access coded waveforms to thereby establish selective communication with at least one of the nodes.

2. A cellular communications system comprising:
   at least one space node having a multiple beam antenna positioned so to establish a first set of cells, each space node including means for transmitting and receiving different predetermined sets of code division multiple access coded, spread spectrum waveforms digitally modulated and incorporating forward error correction coding with the waveforms being located in a predetermined frequency band common to all space nodes, wherein the antenna comprises a reflector with a multiple element feed disposed in the focal region of the reflector;
   at least one surface node positioned so to establish a second set of cells, each surface node including means for transmitting and receiving the predetermined sets of code division multiple access coded, spread spectrum waveforms in the predetermined frequency band;
   a plurality of user units within the cells, each unit including means for communicating with each satellite node and with each surface node and being operatively responsive to a predetermined one of the sets of code division multiple access coded waveforms to thereby establish selective communication with at least one of the nodes; and
   a network controller operationally connected with each space node and with each surface node to selectively allocate communications with said user units among said space and surface nodes.

3. The cellular communications system as in any one of the preceding claims further comprising position means for determining the position of a selected user unit by providing a timing signal to the user unit from one or more nodes, measuring the response time of the user unit to each timing signal, and determining the position of the user unit based on such measurements.

4. The cellular communications system as in claim 3 wherein the position means is also for determining which cell a selected user unit is in and for indicating the location of the cell.

5. The cellular communications system as in claims 1 or 2 wherein the user unit comprises a hand-held, portable transceiver having a substantially non-directional antenna for communicating with the nodes.

6. The communications system as in any one of claims 1 through 2 wherein:
   a user unit and a node each comprises a transceiver for communicating with each other, each of the transceivers comprising:
   a transmitter which outputs a transmitted signal at a controllable power level and includes level data in said signal which is representative of the power level of the transmitter; and
   a receiver which receives the transmitted signal including the level data from the transmitter of the other transceiver, and which comprises:
   measurement means for measuring the signal strength of the signal received from the other transmitter;
   comparison means for comparing the measured signal strength to the received level data; and
   means for controlling the output power level of the associated transmitter of the receiver in the transceiver in accordance with said comparison.

7. The cellular communications system of any of claims 1 through 3 wherein a satellite node includes processing means for receiving signals in a first predetermined plurality of beams, for multiplexing the received signals together and for transmitting the multiplexed signals in a second predetermined plurality of beams.

8. The cellular communications system as in claims 1 or 2 wherein the multi-beam antenna of the space node provides beams of relatively narrow beamwidth.

9. The cellular communications system as in claim 8 wherein the beamwidth of at least one of the beams of the antenna is less than one degree.

10. The cellular communications system as in claim 2 wherein the network controller controls the system such that the user unit communicates with the space node of the cell it is within or with the surface node of the cell it is within based on selectively considering the quality of the signal received from the user unit at each node, the location of the party with which the user unit desires to communicate, and a predetermined allocation of communication resources.

11. The cellular communications system as in claims 1 or 2 wherein the predetermined frequency band is divided into a plurality of sub-bands and communications with each space node are conducted in a first sub-band and communications with each surface node are conducted in a second sub-band.

12. A cellular communications system comprising:
- at least one space node having a multiple beam antenna positioned so to establish a first set of cells, each space node including means for transmitting and receiving different predetermined sets of code division multiple access coded, spread spectrum waveforms digitally modulated and incorporating forward error correction coding with the waveforms being located in a predetermined frequency band common to all space nodes;
- at least one surface node positioned so to establish a second set of cells, each surface node including means for transmitting and receiving the predetermined sets of code division multiple access coded, spread spectrum waveforms in the predetermined frequency band;
- a plurality of user units within the cells, each unit including means for communicating with each satellite node and with each surface node and being operatively responsive to a predetermined one of the sets of code division multiple access coded waveforms to thereby establish selective communication with at least one of the nodes; and
- a network controller operationally connected with each space node and with each surface node to selectively allocate communications with said user units among said space and surface nodes, said network controller controlling the system such that the user unit communicates with the space node of the cell it is within or with the surface node of the cell it is within based on selectively considering the quality of the signal received from the user unit at each node, the location of the party with which the user unit desires to communicate, and a predetermined allocation of communication resources.

* * * * *

UNITED STATES PATENT AND TRADEMARK OFFICE
CERTIFICATE OF CORRECTION

PATENT NO. : 5,339,330
DATED : August 16, 1994
INVENTOR(S) : Albert J. Mallinckrodt It is certified that error appears in the above-indentified patent and that said Letters Patent is hereby corrected as shown below:

On the title page, after item [21] Appl. No.: 781,972, add the following:

--[22] PCT Filed: Oct. 25, 1979

[86] PCT No.: PCT/US91/01852

§ 371 Date: Oct. 24, 1991

§ 102(e) Date: Oct. 24, 1991

[87] PCT Pub. No.: WO 91/15071

PCT Pub. Date: Oct. 3, 1991 --

Signed and Sealed this

Fourteenth Day of January, 1997

Attest:

BRUCE LEHMAN

*Attesting Officer*  *Commissioner of Patents and Trademarks*